June 6, 1967
G. GROTSCH ETAL
3,323,705
CARTRIDGE-OPERATED STUD-SETTING DEVICE
FOR STUDS OF DIFFERENT LENGTHS
Filed Aug. 20, 1965
4 Sheets-Sheet 1
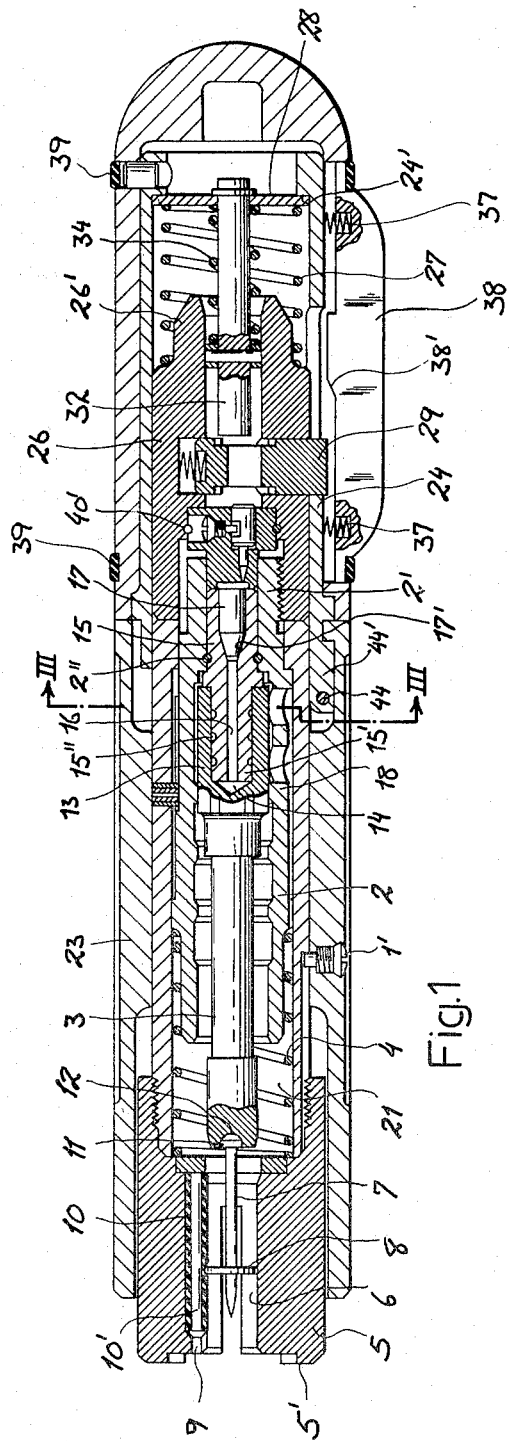
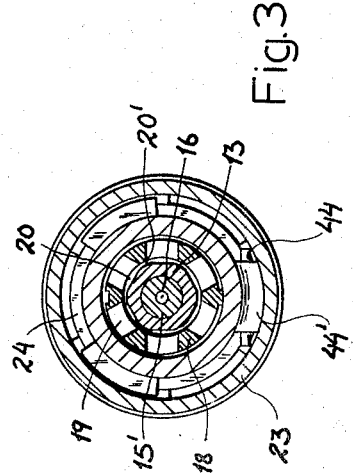
Georg Grötsch
Fritz Schneider
INVENTORS.
BY
Ross & Mestern

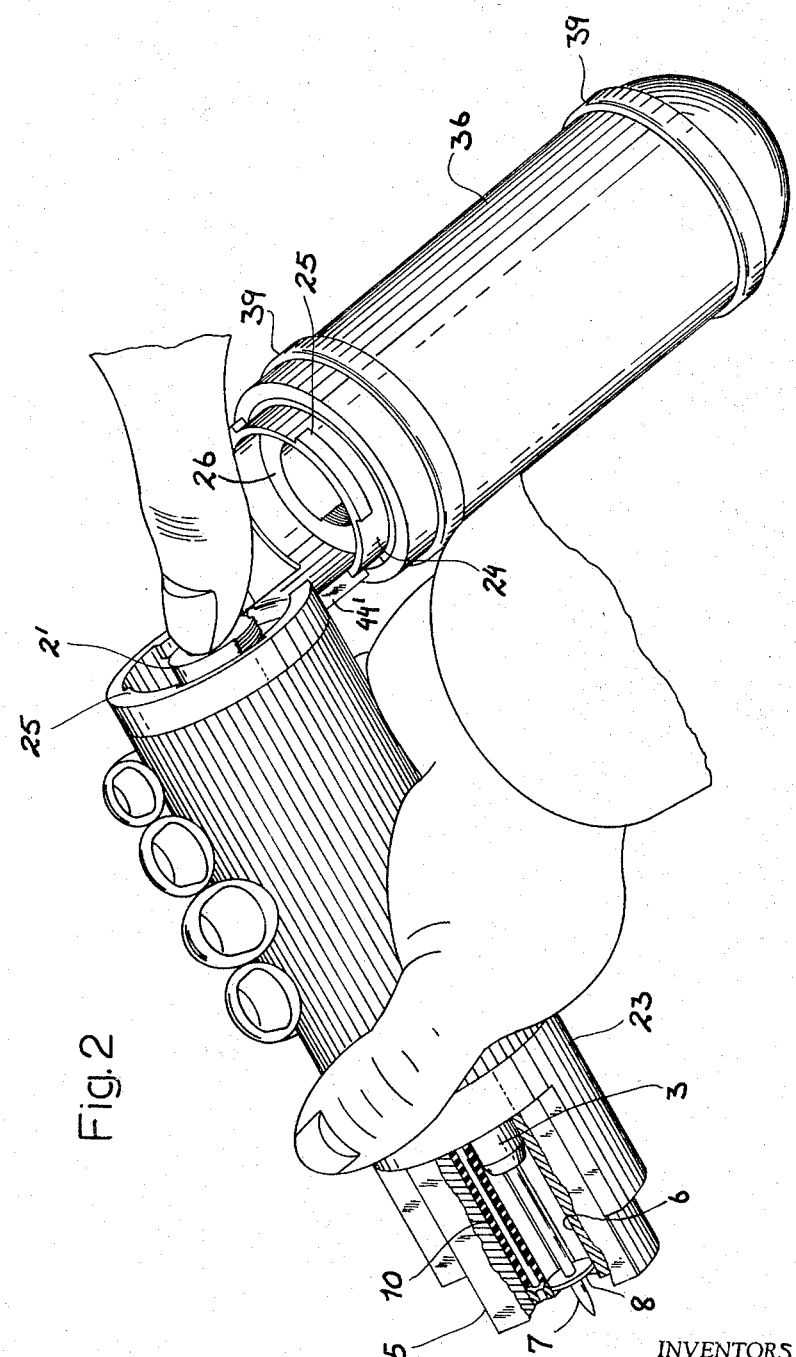

June 6, 1967   G. GROTSCH ETAL   3,323,705
CARTRIDGE-OPERATED STUD-SETTING DEVICE
FOR STUDS OF DIFFERENT LENGTHS
Filed Aug. 20, 1965   4 Sheets-Sheet 3

INVENTORS:
Georg Grötsch
Fritz Schneider
BY
Ross & Mestern

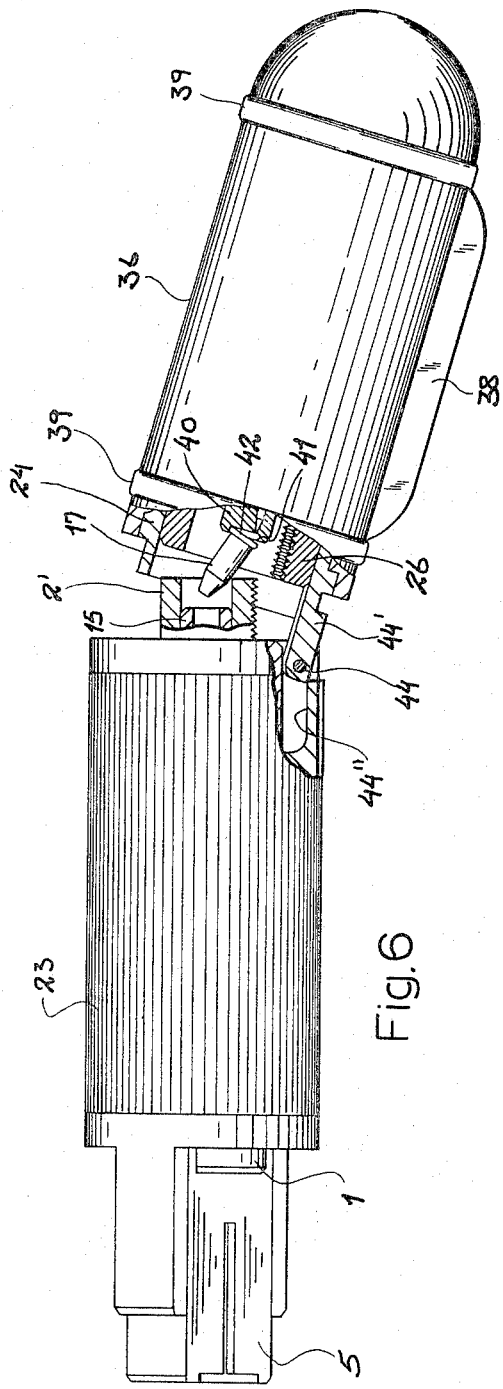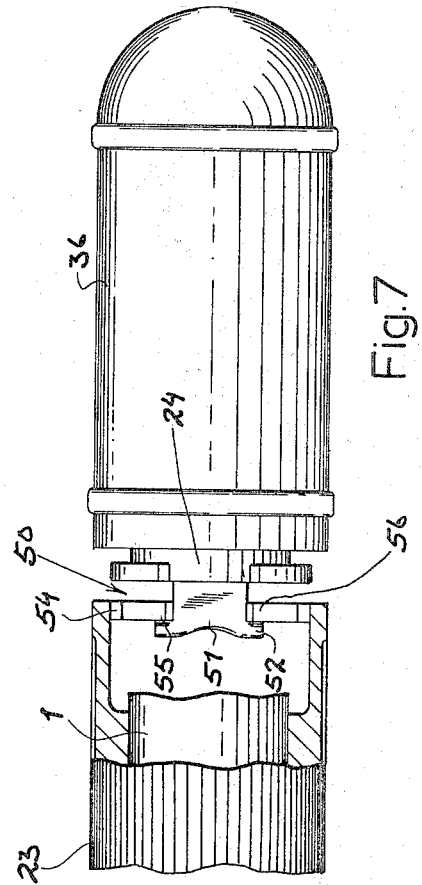

3,323,705
CARTRIDGE-OPERATED STUD-SETTING DEVICE FOR STUDS OF DIFFERENT LENGTHS
Georg Grötsch, Burghernheim, Middle Franconia, and Fritz Schneider, Bad Kohlgrub, Germany, assignors to Impex-Essen Vertrieb Von Werkzeugen G.m.b.H., Ansbach, Middle Franconia, Germany, a corporation of Germany
Filed Aug. 20, 1965, Ser. No. 481,240
12 Claims. (Cl. 227—8)

This application is a continuation-in-part of our copending application Ser. No. 277,229, filed May 1, 1963, now abandoned.

As originally set forth in the above-identified copending application, the present invention relates to a cartridge-operated stud-setting device for the forcible insertion of pins, bolts and like members (collectively designated "studs") in relatively hard or rigid surfaces of structural elements or the like. Most earlier stud-setting devices have been provided with a piston driven by the expanding gases originating at a so-called "blank" cartridge to drive a stud, lodged in the barrel of the device, through a surface against which the muzzle was held. The prior-art systems have involved many problems with respect to insertion, disorientation and removal of a stud; nonadaptability without structural modification or barrel replacement to accept studs of various lengths; and the fouling or contamination of the cartridge and expansion chambers by the residue of the explosion produced by the combustion of the cartridge powder.

In our copending application mentioned above, we have pointed out that disadvantages with respect to disorientation of the stud, i.e. its improper placement and positioning in the barrel device, could be solved by the provision of a guide bushing for the gas-operated piston which is longitudinally shiftable together therewith within a sleeve carrying a muzzle piece adapted to bear against the stud-receiving surface. This arrangement, which will be described in greater detail hereinafter, facilitates ejection of a stud which may have been inserted in an askew position or may have become askew after insertion. In conventional stud-setting devices of the character described, the stud is usually inserted through the muzzle piece into the barrel of the device in alignment with a piston, ram or plunger which is designed to drive the stud through or into a structural element upon the firing of the cartridge. When, however, the stud is in an askew position within the muzzle, the firing of the cartridge and rapid advance of the piston or plunger is capable of bending the stud or wedging it firmly into the muzzle, thereby making its removal or replacement difficult and even causing damage to the device. Moreover, conventional systems in which the piston also forms an expandable combustion chamber with the cartridge seat carried by the barrel are characterized by the fouling of the guide surfaces for the piston by the residue of the cartridge explosion; the contamination is capable of sharply increasing resistance to both the forward or stud-setting movement of the piston and the rearward or restoring motion thereof in which the piston is returned to its original position for the next stroke.

It is, therefore, the principal object of the present invention to provide an improved stud-setting device of the type described in the aforementioned copending application which permits of rapid and simple removal of a disoriented stud or an otherwise defective stud for the device without damage thereto.

Another object of this invention is to provide, in a cartridge-operated stud-setting device, improved means for preventing the fouling of the guide surfaces of the moving elements of the device.

Another object of this invention is to provide an explosively actuated setting device of the character described which is capable of accommodating studs of various lengths without major modification or substitution of muzzle members.

Still another object of the invention is to advance the principles originally set forth in the copending application mentioned above and thus to provide an improved, conveniently operable cartridge-type stud-setting device for the forcible insertion of pins, bolts and like fastener members in relatively hard and rigid surfaces of structural elements.

These objects and others which will become apparent hereinafter are obtained, in accordance with the present invention and as originally disclosed in our copending application Ser. No. 277,229 by a cartridge-operated stud-setting device having an elongated guide sleeve or barrel provided with a muzzle piece adapted to receive a stud and to bear against the surface through which the stud is to be driven; the guide sleeve of the stud-setting device of this invention is axially shiftable within the housing and slidably receives a guide bushing which forms a cartridge holder or seat and in which the plunger-type ram or piston is shiftable by the expansion of the cartridge gases to drive the stud through the surface against which the muzzle is held. Thus, essential elements of the present invention include a longitudinally shiftable guide bushing which surrounds the piston, the latter being longitudinally shiftable relatively to the guide bushing. At its rearward extremity, i.e. its extremity remote from the muzzle, the guide bushing is provided with the cartridge holder or seat which is formed with a longitudinally extending through-going bore opening into an expansion chamber of the piston. The stud, which is generally provided with an annular centering flange disk portion or the like, is retained by the muzzle and, advantageously, has a head extending into a centering recess of the piston. The longitudinal shiftability of the guide bushing and piston within the guide sleeve relatively to the muzzle serves to permit the discharge or ejection of a stud improperly inserted in the muzzle or askew therein. Thus, a bolt whose head is not properly centered in the recess in the forward end of the piston, can be ejected by hand without damage to the device. According to a more specific feature of the invention, the housing comprises a handle portion connected with the barrel but removable or openable to expose the rear end of the guide bushing, thereby permitting the latter to be depressed to dislodge an improperly inserted stud.

Another aspect of the present invention resides in the means whereby fouling or contamination of the guide surfaces of the bushing and piston by the cartridge residue is prevented. Whereas in conventional stud-setting devices, uncombusted powder particles and combustion residues lodge themselves between the guide surfaces of the relatively shiftable parts, the present invention provides that the rearward extremity of the guide bushing be formed with at least one but preferably a plurality of lateral flushing bores, especially in the region at which the guide bushing slidably engages the rearward extremity of the plunger, preferably, rearwardly of the contacting region. In this construction, uncombusted and partially combusted powder particles and combustion residues are entrained by the rapidly moving gas stream generated upon firing of the cartridge through the flushing bores and thus are removed from the region of the contacting surfaces. There is thus no danger that residual particles will contaminate the guide surfaces and increase the resistance to sliding displacement or either the guide bushing or the plunger therewithin.

Moreover, we prefer to so shape the rearward extremity of the plunger that longitudinal channels are provided between it and the guide bushing, thereby forming additional passages for the rapidly moving gas stream and ensuring a minimum of frictional interengagement between the guide bushing and plunger. According to this aspect of the invention, the head of the plunger has advantageously a prismatic configuration and engages the guide bushing only with line contact. The gas stream passing along the axially extending channels thus serves to dislodge and remove uncombusted particles of the cartridge powder.

To accommodate the stud-setting device to bolts of different lengths, we have found it to be especially desirable to provide at least one and preferably a plurality of lateral longitudinally extending recesses in the wall of the muzzle piece and to position a longitudinally extending resilient clamping member in each of the recesses. The centering annulus of the stud can thus be resiliently engaged by the elastomeric members (e.g. rubber-retaining tubes) so that the piston force need merely overcome the slight resistance of these retaining members to axial displacement of the stud, while the retaining members center and hold the stud with its annulus in any axial position along the muzzle.

According to still another feature of the present invention, abutment means are provided in the forward portion of the housing or barrel for limiting the displacement of the guide bushing therein, while the forward portion is connected with the rearward portion by a coupling engageable and disengageable by relative rotation of the forward and rearward portion. The rearward portion of the housing can also be hinged to the forward portion by a flat-type joint and is advantageously provided with a catch-member or detent means for blocking the firing pin or plunger which is also axially shiftable in this rearward portion under the action of a compression spring stressed upon the application of the muzzle piece against a surface adapted to receive the stud. This arrangement affords an unobjectionable connection of the separable portions of the housing and sleeve while providing automatic readying of the firing mechanism in a simple and secure manner.

The above and other objects, features and advantages of the present invention will become more readily apparent from the following description, reference being made to the accompanying drawing in which:

FIG. 1 is an axial cross-sectional view through a cartridge-operated stud-setting device according to the invention;

FIG. 2 is a perspective view of the device showing the handle proportion thereof partially disengaged from the barrel portion in the position of the device in which a mispositioned stud can be ejected;

FIG. 3 is a cross-sectional view taken generally along the line III—III of FIG. 1 and showing the configuration of the head of the piston;

FIG. 6 is an elevational view, partly broken away, illustrating the device in a partially open position for ejection of the fired cartridge; and FIG. 7 is a fragmentary elevational view, partly broken away, showing in detail means for connecting the forward and rearward parts of the housing.

Figure 4:
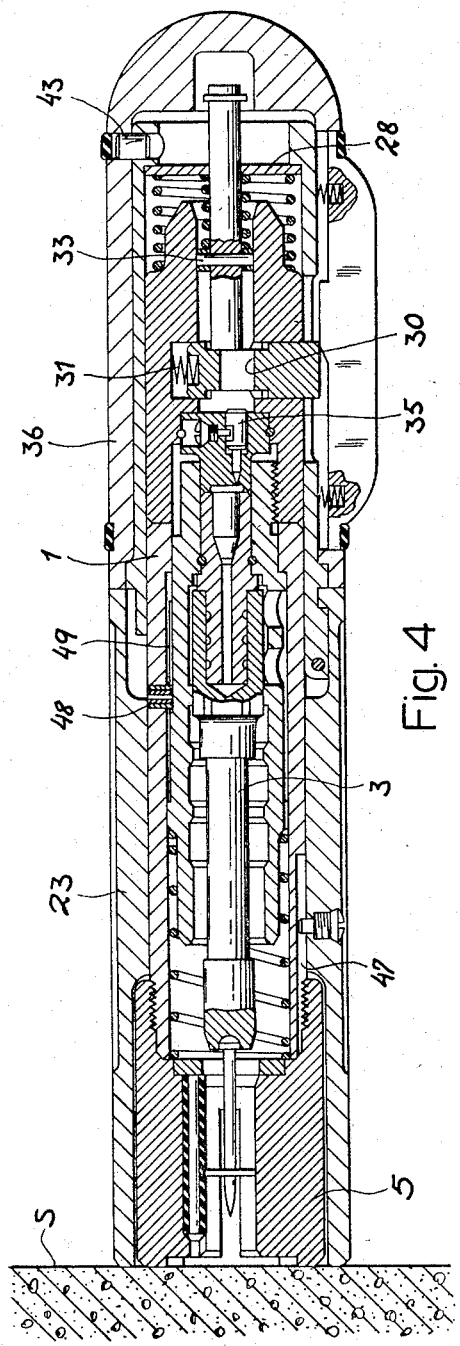
FIG. 4 is a view similar to FIG. 1 showing the device position just prior to firing.

Referring now especially to FIGS. 1–5, it will be seen that the stud-setting device basically comprises an elongated guide sleeve or barrel 1 within which a guide bushing 2 is axially shiftable against the force of a compression spring 4. The guide bushing 2 slidably receives an axially extending piston 3 whose forward extremity is formed with a central recess 12 receiving the head 11 of a stud 7. The forward end of the guide sleeve 1 is connected with a muzzle piece 5 whose surface 5′ is adapted to bear against the stud-receiving surface S (FIGS. 4 and 5) the axially extending bore 6 of the muzzle piece 5 accommodates the stud 7. The centering annulus 8 of the latter is releasably engaged by an axially extending tubular elastomeric retainer 10 surrounding a support rod 10′ which is held in place by a bore 9 laterally opening into the central cavity 6 of the muzzle piece and thus forming axially extending recess accommodating the retaining means 10. The latter is so dimensioned with respect to the diameter of cavity 6 as to engage the annuluses 8 of studs 7 of varying length, the entire length of the elastic retainer 10 being effective for this purpose.

As can be seen in FIG. 2, opening of the breech of the device exposes the rearward end 2′ through the breech. When the housing is held in the hands of the operator, this rearward portion 2′ can be depressed while an abutment formed by screw 1′ holds the guide sleeve 1 against forward displacement beyond its position illustrated in FIG. 1. The guide bushing 2 and the ram 3 are thereby advanced to eject from the cavity 6 of the muzzle 5 a stud 7 whose head 11 is not properly received in the recess 12 or is askew in the cavity. Upon ejection of an improperly placed fastening stud, the spring 4 urges the guide bushing 2 and the ram 3 rearward into the position illustrated in FIG. 1.

For the explosive driving of the ram 3, the latter is formed with an axial bore at its breech end 13, this bore defining with an axial projection 15′ of the cartridge holder 15 a pressure chamber 14. The latter is designed to receive the expanding gases supplied to axial bore at its breech end 13, this bore defining with an axial projection 15′ of the cartridge holder 15 a pressure chamber 14. The latter is designed to receive the expanding gases supplied to axial bore 16 and to drive the ram in the forward direction. The projection 15′ of the cartridge holder 15 is formed with annular grooves 15″ designed to reduce the sliding friction between the breech end of ram 3 and the cartridge holder 15, while clearing the contacting surfaces to preclude contamination by uncombusted explosive powder or by combustion residues. The cartridge holder 15, held in the axially shiftable guide bushing 2 by a locking ring 2″ and has a seat 17′ for a blank cartridge 17 insertable into the seat. The cartridge 17 is designed to discharge its expanding gases through the bore 16 into the pressure chamber 14.

In order to prevent contamination of the guide surfaces of the bushing 2 and the ram 3 by uncombusted particles of the explosive powder, the rearward or breech end 18 of the guide bushing 2 is provided with a plurality of axially and angularly spaced transverse (i.e. radial) bores 19 (FIGS. 1 and 3). These transverse bores of large cross-section serve to permit rapid escape of the exhausted gases upon discharge of the cartridge, thereby permitting these rapidly moving gases to entrain solid particles of uncombusted powder or combustion residues through the openings and away from the guide surfaces. Additionally, the rearward or breech end 13 of the ram 3 is formed with a polygonal profile or configuration, preferably hexagonal, so that it is only in line contact with the internal walls of the circumferential guide bushing at 20′. The segmental spaces 20 defined between the hexagonal head 13 of ram 3 and the cylindrical wall of guide bushing 2 constitute axially extending channels through which the explosion gases can escape by passing into the space 21 forwardly of the ram, thereby dislodging unburned powder particles.

The barrel 1 and the muzzle piece 5 of the stud-setting device form, as can be seen from FIG. 4, a longitudinally shiftable unit with the guide bushing 2 and its ram 3. This assembly acts upon a force-transmitting body 26 which serves to stress the spring 27 of the firing means within the rearward portion of the housing 36 and to release the firing means or trigger it as will become apparent hereinafter. The lower housing portion 23 is linked with the sleeve 24 of the upper housing portion 36 via a bayonet connection 25 (FIG. 2) or a partial-thread or other rotary joint. Thus, the assembly of barrel 1, muzzle piece 5, guide bushing 2 and ram 3 can be shifted axially within the housing and the sleeve 24 against the body 26 which is entrained thereby to compress the spring 27 at the right-hand extremity of the device. This spring 27 is centered by a boss 26' of body 26 and is seated against a plate 28 retained by a shoulder 24' of the sleeve 24.

Figure 5:
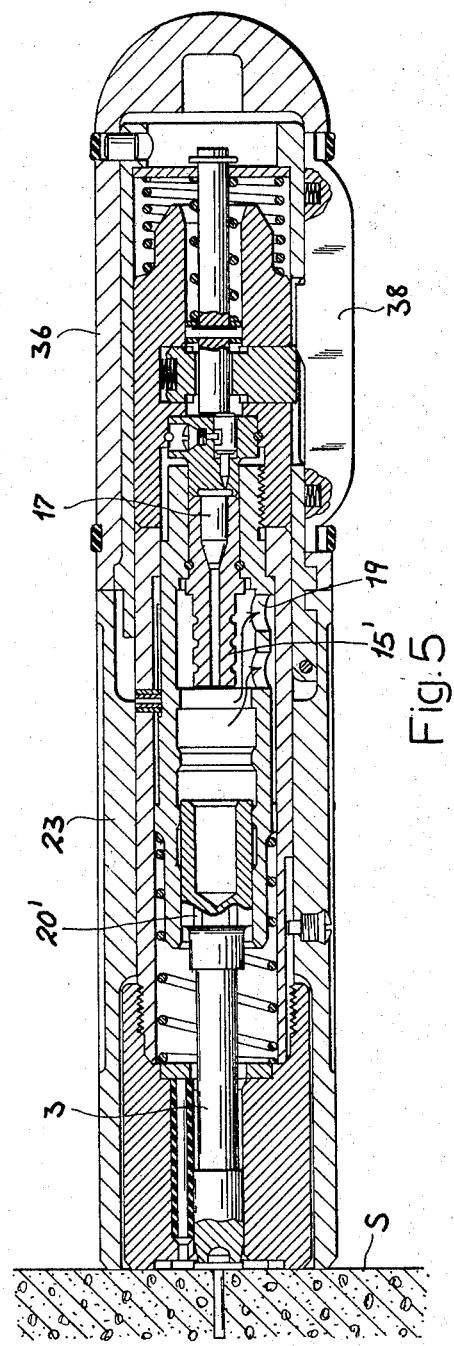
FIG. 5 is a view similar to FIG .1 showing the device subsequent to discharge of the cartridge and driving of the stud.

Movement of the body 26 to the right causes the firing-release member 29, which is transversely shiftable in body 26, to be cammed radially inwardly by a ram 38' of an actuating bar 38 resiliently supported in the housing by spring 37 against rubber rings 39. The release member 29 thus serves as a latch whose bore 30 is held in an eccentric position with respect to the rod 32 by a spring 31. The rod 32 constitutes an impacting member whose shoulder 33 is urged to the left by a spring 34 coaxial with the rod 32 and bearing against the plate 28. Shoulder 33 guides the rod within the boss 26' of the annular body 26. A firing pin 35 is limitedly shiftable in axial direction within a bushing 40 of the body 26 and is aligned with the plunger 32 so that, as can be seen in FIG. 5, radial displacement of the release 29 by the firing member 38 will bring the bore 30 into registry with the plunger 32 and permit the spring 34 to drive the latter to the left and force the firing pin 35 against the primer of the cartridge 18. The latter then discharges so that its gases pass through the bore 16 (FIG. 5) into the chamber 14 and advance the ram 3 to drive the stud 7 through the surface S. The exhaust gases then flow through the bores 19 outwardly from the guide bushing 2 and via the axially extending channels 20' into the chamber 21 forwardly of the bushing 2, thereby purging the guide surfaces and chambers of uncombusted powder particles or combustion residues.

To withdraw the fired cartridge (FIG. 6), the breech of the device is opened. For this purpose, the bushing 40, which is held in the body 26 by a locking ring 40', is provided with hook-like extracting claws 41 which grip around the flange or base 42 of the cartridge 17. The gas pressure within the chamber 14 causes the rim or base 42 of the cartridge to seat itself firmly in the claws 41.

By relative rotation of the housing portions 23 and 24, the bayonet connection can be released. For this purpose the sleeve 24 is connected to the handgrip portion 36 of the housing by a pin 43. The sleeve 24 is provided with a flap 44' which is swingable about the pivot 44 in a guide 44" of the housing portion 23. Thus, release of the bayonet coupling permits the two housing portions to be drawn apart and the housing portion 36 to be swung about the pivot 44. The cartridge thus contacts an edge of bushing 2 and is forcibly dislodged from the claws 41. To permit the use of a rotary connection between the barrel 1 and the bushing 2 with the rearward portion of the housing, the barrel 1 is provided with an axially extending slot 47 onto which the screw 1' projects. A further pin 48 (FIG. 4) engages a slot of the bushing 2 to ensure rotary entrainment of the bushing by the barrel, the slot for pin 48 being shown at 49.

Referring now to FIG. 7, it can be seen that the bayonet connection 50 between the sleeve 24 and the forward housing portion 23 can, instead of the flap 44' and the pin 44, include a flap 51 with lateral formations 52 which co-operate with the shoulders 55 and 56 to permit relative rotation of the housing portions and their axial displacement. The flap 51 lies, in its latched stage, partially below the bayonet shoulders 54 of the forward housing portion 23. Upon release of the bayonet connection, the upper housing portion can be shifted to the right and the assembly swung about a pivot corresponding to the formations 55 and 56, much in the manner as illustrated in FIG. 6.

The invention described and illustrated hereinabove is considered to admit of many modifications and variations which will be readily apparent to those skilled in the art and are intended to be included within the spirit and scope of the appended claims.

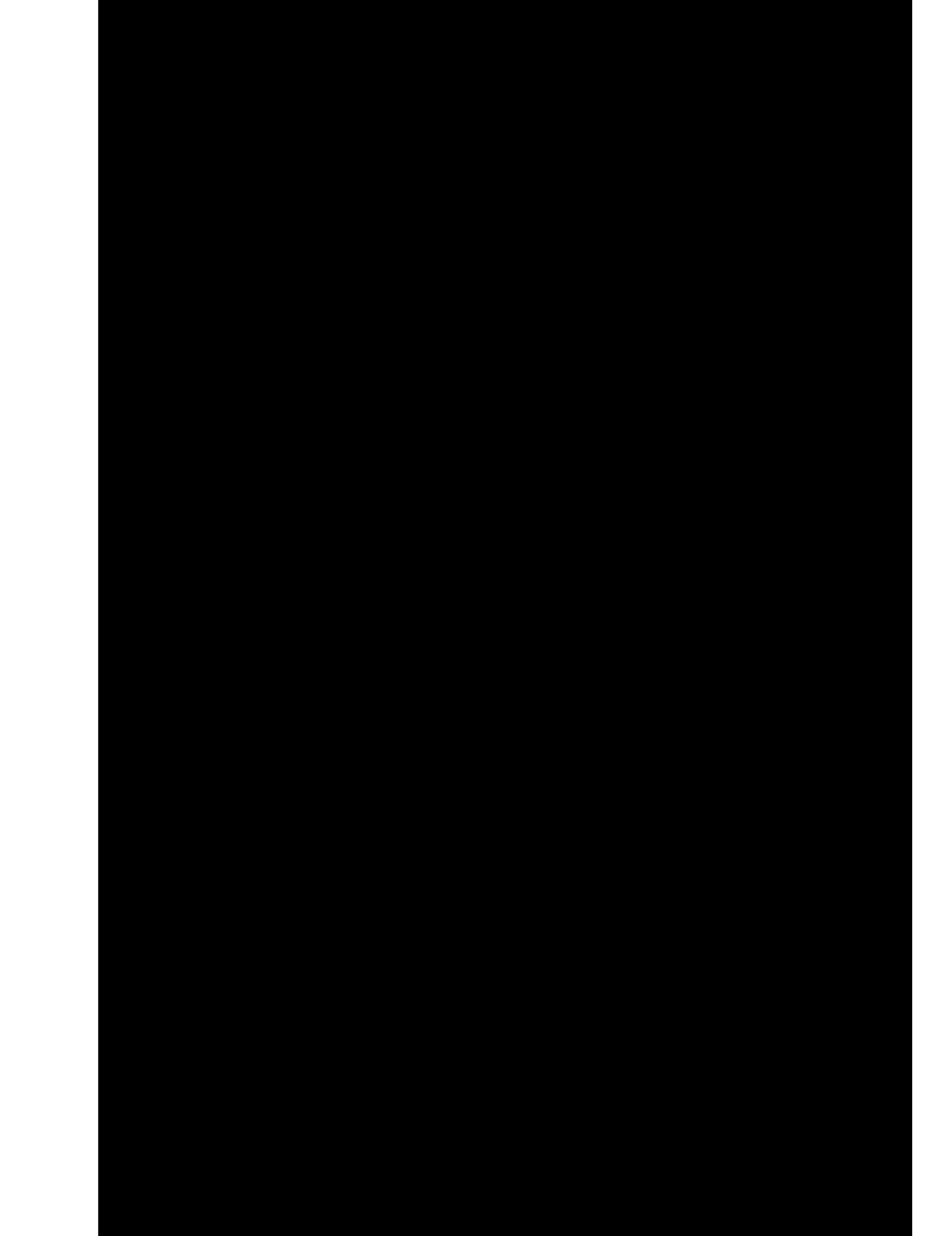

We claim:
1. A cartridge-operated stud-setting device, comprising:
 a housing;
 a barrel axially shiftable in said housing and provided with a muzzle piece at a forward end of said barrel adapted to receive stud to be explosively driven into a stud-receiving body;
 an elongated guide bushing extending within said barrel and axially movable relatively thereto, said guide bushing having a cartridge-holding means at an extremity of said bushing remote from said muzzle piece;
 a longitudinally extending ram received in and axially shiftable relatively to said bushing while defining with said cartridge-holding means a pressure chamber for receiving expanding gases from a cartridge in said cartridge-holding means to advance said ram in the direction of said muzzle piece and drive a stud received thereby; and
 spring-loadable firing means in said housing stressable upon displacement of said barrel and said muzzle piece relatively to said housing, and triggerable to actuate said firing means to discharge a cartridge in said cartridge-holding means.

2. A stud-setting device as defined in claim 1, further comprising spring means bearing upon said barrel and said bushing for urging said bushing away from said muzzle piece, said housing being openable to expose said bushing at a location remote from said muzzle piece to permit at least limited axial displacement of said bushing and said ram in the direction of said muzzle piece to dislodge therefrom a stud improperly positioned in said muzzle piece.

3. A stud-setting device as defined in claim 2, wherein said cartridge-holding means includes an axially extending projection received in said ram and provided with a bore for feeding expanding gases from a fired cartridge to said chamber, said ram having a head engaging said bushing with substantially only line contact at least in the region of said chamber.

4. A stud-setting device as defined in claim 3, wherein said head is of polygonal configuration and forms a plurality of axially extending channels with said bushing to permit gases from said cartridge to sweep powder particles from the contacting regions of said ram and said bushing.

5. A stud-setting device as defined in claim 3, wherein said bushing is provided with a plurality of lateral bores at least in the region of said chamber for discharging combustion gases therefrom together with particles of cartridge powder entrained by said gases.

6. A stud-setting device as defined in claim 2, wherein said muzzle piece is provided with an internal cavity adapted to receive said stud and said stud has a centering annulus at an intermediate location therealong, said muzzle piece being provided with at least one axially extending recess communicating with said cavity over a substantial fraction of the length thereof, said device further comprising retaining means along said cavity engageable by the annuluses of studs of various lengths insertable into said muzzle pieces at various axial locations within said cavity.

7. A stud-setting device as defined in claim 6, wherein said retaining means includes an elongated elastomeric body disposed in said recess and projecting slightly into said cavity.

8. A stud-setting device as defined in claim 2, wherein said housing comprises a forward housing portion receiving said barrel, bushing and ram, and a rearward housing portion enclosing said firing means, said housing portions